(12) United States Patent
Pawluczyk

(10) Patent No.: US 6,765,669 B1
(45) Date of Patent: Jul. 20, 2004

(54) SIGNAL ENHANCEMENT OF SPECTROMETERS

(75) Inventor: Romuald Pawluczyk, Conestogo (CA)

(73) Assignee: CME Telemetrix Inc., Waterloo (CA)

( * ) Notice: Subject to any disclaimer, the term of this patent is extended or adjusted under 35 U.S.C. 154(b) by 0 days.

(21) Appl. No.: 10/021,307

(22) Filed: Oct. 22, 2001

Related U.S. Application Data

(60) Provisional application No. 60/241,798, filed on Oct. 20, 2000.

(51) Int. Cl.⁷ .................................................. G01J 3/28
(52) U.S. Cl. ........................................ 356/326; 356/328
(58) Field of Search ................................. 356/326, 328

(56) References Cited

U.S. PATENT DOCUMENTS 4,715,712 A * 12/1987 Nogami ...................... 356/328
4,798,464 A * 1/1989 Boostrom .................... 356/328
5,959,738 A * 9/1999 Hafeman et al. ............ 356/440
6,373,568 B1 * 4/2002 Miller et al. ................. 356/326

* cited by examiner

Primary Examiner—Zandra V. Smith
Assistant Examiner—Kara Geisel
(74) Attorney, Agent, or Firm—Needle & Rosenberg, P.C.

(57) ABSTRACT

The present invention provides an apparatus and method for enhancing the system response of a photodetector array based spectrometer. For a spectrometer with a given system response curve, secondary light sources are provided to improve the system response in the spectral ranges where the dynamic range is less than at the peak of the curve. In one embodiment, multiple light sources can be combined by means of multiple branches of fibre optic bundles. The secondary light sources may be used in combination with suitable shaping filters and/or masks to further flatten the system response.

14 Claims, 5 Drawing Sheets

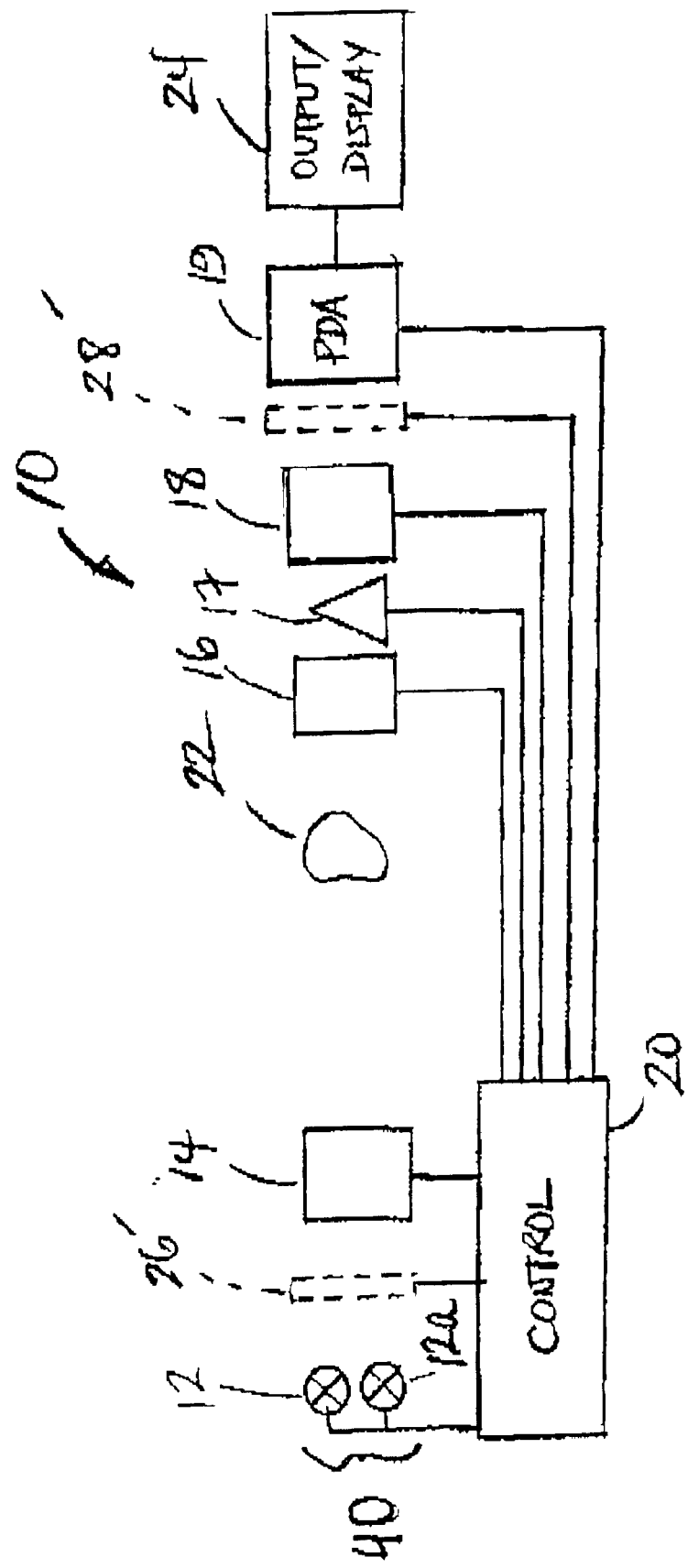

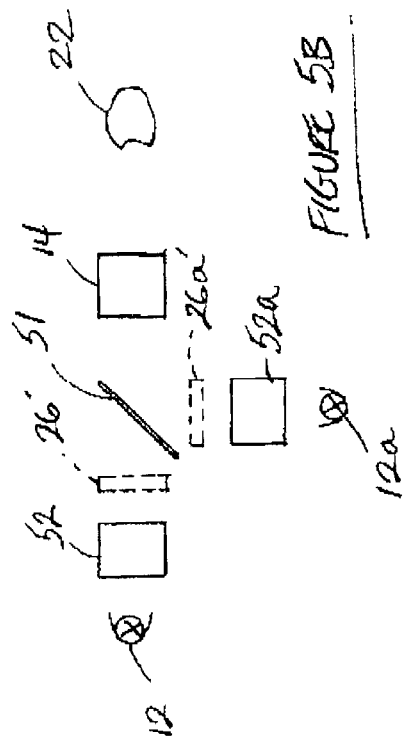
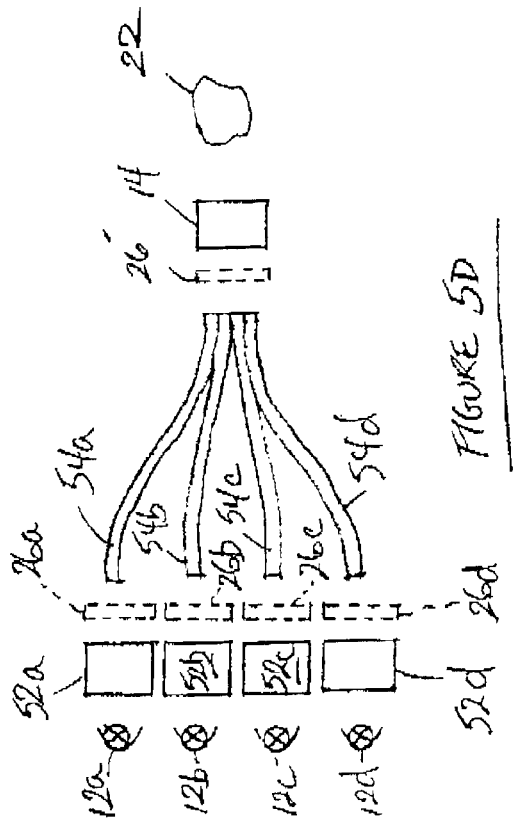
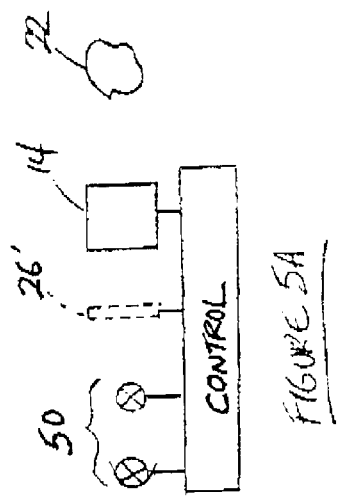
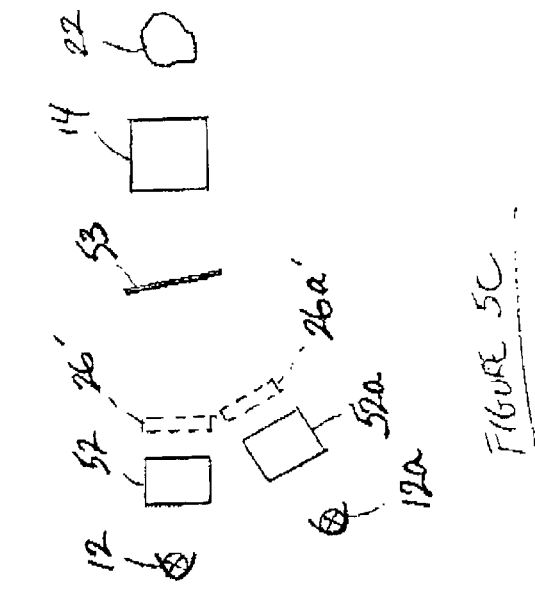

SIGNAL ENHANCEMENT OF SPECTROMETERS

CROSS-REFERENCE TO RELATED APPLICATION

The benefit of the filing date of U.S. Provisional Patent Application Serial No. 60/241,798, filed Oct. 20, 2000, entitled "SIGNAL ENHANCEMENT OF SPECTROMETERS," is hereby claimed, and the specification thereof is incorporated herein in its entirety by this reference.

FIELD OF THE INVENTION

This invention relates to an apparatus and method for enhancing the system response of a photodetector array based spectrometer.

BACKGROUND OF THE INVENTION

The performance of a spectrometer is generally determined by the signal-to-noise (S/N) ratio of the system in the entire operating spectral range. Ideally, the spectrometer should provide a constant and high S/N ratio over the range. However, due to various technical limitations in prior art spectrometers, it has been very difficult or impossible to achieve a constant, high S/N ratio over a wide range mainly because of spectral variations in available light intensity and spectral variations of detector sensitivity. In scanning type spectrometers, this problem can be at least partially resolved with A suitable electronics design, exhibiting a response which may vary depending on signal level to secure the best S/N ratio at each measurement point. However, in photodetector array based instruments, where the complete spectrum is registered simultaneously applying constant electronic gain, the above approach cannot be used. Consequently, a new approach to providing a relatively constant and high S/N ratio across the entire operating spectral range is needed.

SUMMARY OF THE INVENTION

Accordingly, it is an object of the present invention to provide an apparatus and method of enhancing the system response of a photodetector based spectrometers which addresses some of the limitations of prior art instruments.

In one aspect, the present invention provides a method for improving the system response of a photodetector array based spectrometer having a main light source with a primary spectral component, comprising the steps of: (i) determining a system response curve for said spectrometer over said spectrometer's operating spectral range; (ii) identifying at least one spectral band at which the system response curve falls below a predetermined value; and (iii) adding at least one secondary light source with a secondary spectral component complementary to said at least one spectral band identified in step (ii) so as to produce a combined spectral output which provides a modified system response curve which is at or above said predetermined value at said spectral band.

In an embodiment of the present invention, the method further comprises the step of filtering said combined spectral output so as to reduce peaks in the system response curve.

In another embodiment, the method may further comprise the step of masking said photodetector array so as to equalize the system response curve.

In another aspect, the present invention provides a light source for a photodetector array based spectrometer, said light source comprising a primary light source producing a primary spectral output which results in a characteristic system response curve, said light source further including at least one secondary light source producing a secondary spectral component which combines with said primary spectral output, whereby, said combined spectral output results in a more uniform system response curve that is flatter than the system response curve obtained when a primary light source alone is used.

In one embodiment, the secondary light source is a broadband light source having a shaping filter.

In another embodiment, the secondary light source is a narrow band light source.

In yet another embodiment, the narrow band light source is selected from the group consisting of a narrow band fluorescent light source, a light emitting diode, and a laser.

In a further embodiment, the multiple light sources are combined by means of multiple branches of fibre optic bundles.

Other features and advantages of the present invention will become apparent from the following detailed description. It should be understood, however, that the detailed description and the specific examples while indicating preferred embodiments of the invention are given by way of illustration only. Various changes and modifications within the spirit and scope of the invention will become apparent to those skilled in the art from this detailed description.

BRIEF DESCRIPTION OF THE DRAWINGS

For a better understanding of the present invention, and to show more clearly how it may be carried into effect, reference will be made by way of example to the accompanying drawings in which:

FIG. 4 shows a schematic block diagram of a modified photodetector array—based spectrometer according to the present invention; and FIGS. 5A–5D show various alternative embodiments for combining light sources according to the present invention.

DETAILED DESCRIPTION OF THE INVENTION

Figure 1:
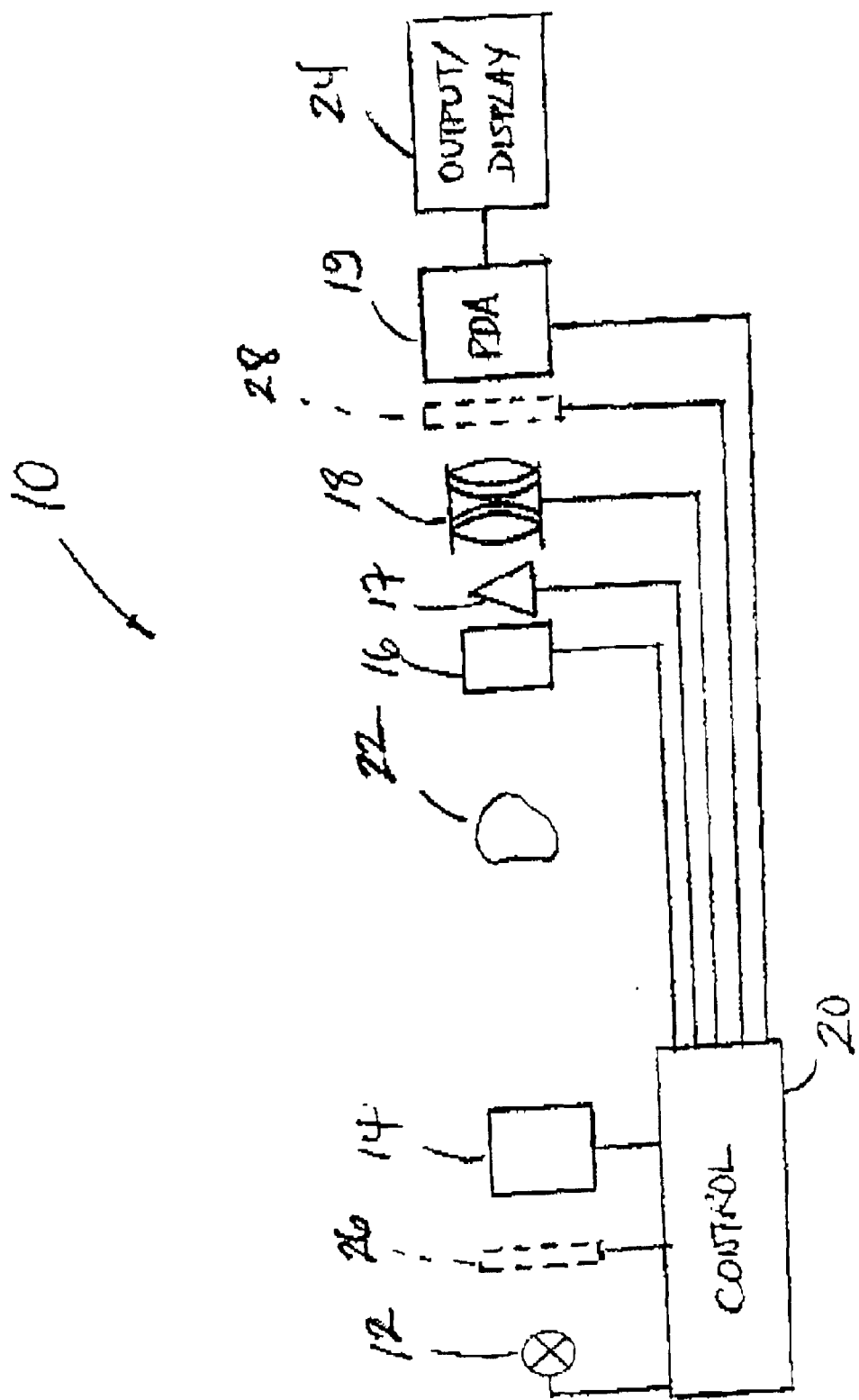
FIG. 1 shows a schematic block diagram of a photodetector array based spectrometer according to the present invention.

As mentioned above, the present inventor has developed an apparatus and method of enhancing the system response of photodetector based spectrometers. In FIG. 1, a photodetector array based spectrometer is shown and generally referred to by reference numeral 10. The spectrometer 10 comprises a light source 12, an illumination light transferring and beam forming first optical component 14, a light collecting and transferring second optical component 16, a light dispersing component 17, an optional light forming component 18, a photodetector array (PDA) 19 and control 20.

In operation, a component or sample 22 is placed between the light source 12 and the PDA 19 as shown in FIG. 1. The light source 12 produces light with a broad band spectrum preferably within a given limited band width and this light is suitably collected, transferred and formed by the first optical component 14 directing the light towards the sample 22. The second optical component 16 receives the light after its interaction with sample 22, forms the light beam and directs it to the spectrum dispersing component 17. The light dispersing component 17, possibly with the help of an auxiliary optical component 18, sends different spectral component of light to different photosensitive elements of the PDA 19. An optional spectrum shaping filter 26, shown in dotted outline between the light source 12 and the first optical component 14, can be used to modify the spectral composition of light produced by the light source 12. It will be evident to those skilled in the art that the filter 26 can be placed in any position between light source 12 and PDA 19. However, the preferred position is between the light source 12 and the sample 22. Also, an optional mask 28 is shown in dotted outline and can be used to mask the size of the active area of particular components (i.e. pixels) of PDA 19.

By comparing the spectrum of light in the presence and absence of the sample 22, and by analyzing the relations between the spectra, certain information on sample property (e.g. chemical composition) can be obtained. Results of the comparison can be presented in different ways. For example, a logarithm of the ratio of light intensity registered in the presence and absence of the sample for each pixel can be calculated. Under certain conditions this logarithm may represent the absorbance characteristics of the sample 22. For this reason, very often, the logarithm is simply referred as the absorbance. In the example shown in FIG. 1, such a result may be viewed on an output display 24.

Figure 2:
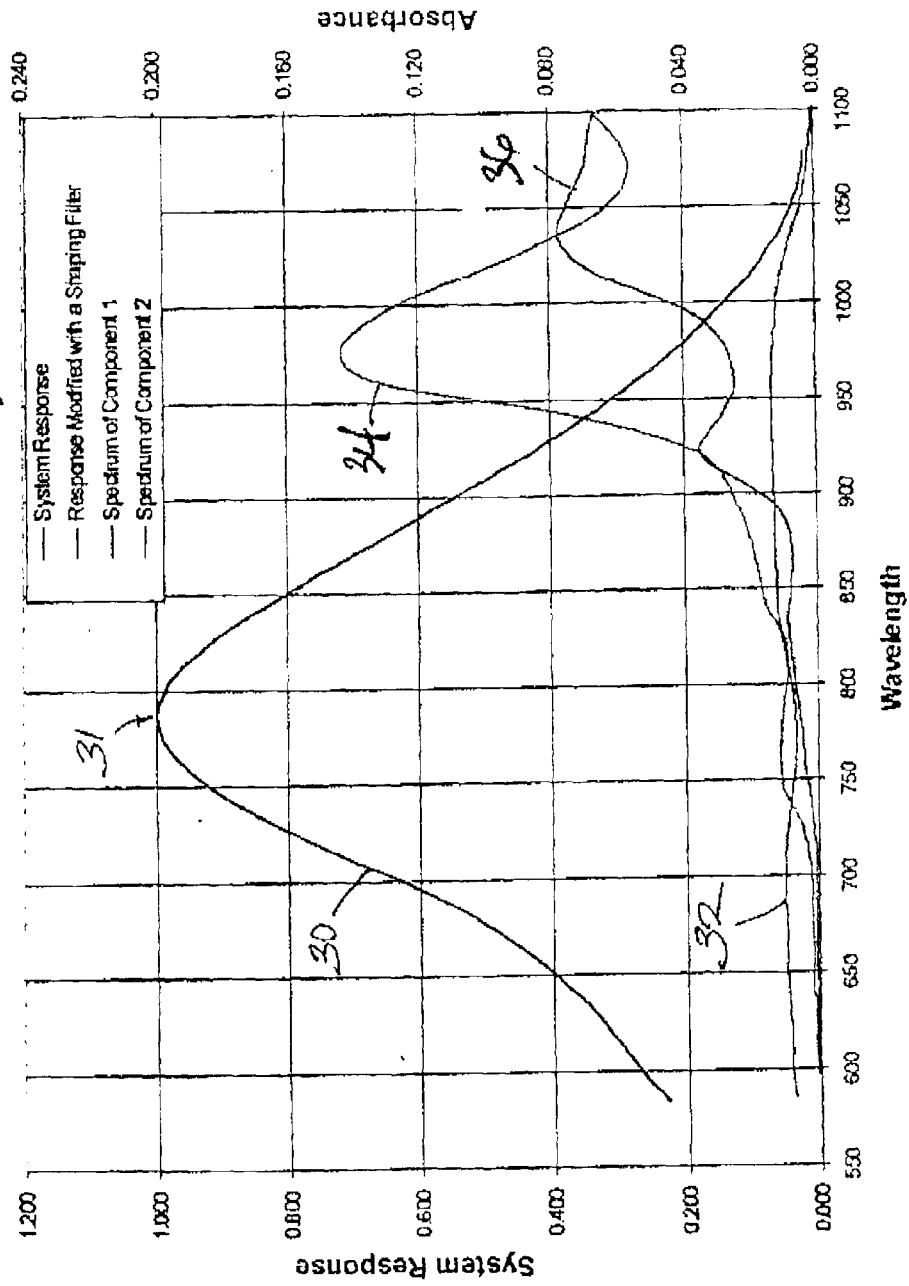
FIG. 2 shows a graph of a typical system response curve for a spectrometer having a silicon photodetector array.

Now referring to FIG. 2, shown is a graph illustrating a typical system response curve 30 for a prior art photodetector array based spectrometer, The system response curve 30 is graphed over a spectral range from about 580 nm up to about 1080 nm. The curve 30 peaks at about 780 nm (indicated by reference numeral 31). The system response curve 30 is measured off the left vertical scale which is normalized to 1.000 at the peak 31. On either side of the peak 31, the system response deteriorates rapidly causing the S/N ratio to drop by a factor of 5 at about 580 nm and 980 nm on either side of the peak 31. Above 980 nm, the system response degrades even further until the signal, and thus S/N ratio, is very poor and virtually unusable.

The practical effect of the system response as presented by the curve 30 shown in FIG. 2 is that the dynamic range, and therefore the measurement precision of the instrument, varies significantly across the spectrum. For substances having an absorption band in the middle of the operating spectral range of the instrument, i.e. near 780 nm, the absorption measurement precision of the instrument would be higher than for substances with absorption bands near the ends of the spectral range of the instrument.

As mentioned above, one reason for the variation in the performance over the operating spectral range is the performance of the optical components and sensitivity variation of the photodetector array. Thus, one approach to correcting this system response problem is to use a suitable spectrum shaping filter 26 and/or mask 28 to achieve a flatter system response curve across the wavelength spectrum. Such a modified system response curve is shown in FIG. 2 and identified by reference numeral 32. Curves 34 and 36 are measured off the right vertical scale and characterize the absorbency of component 1 and component 2, respectively.

While a flatter system response can be achieved either by suitable masking of the PDA 18 and/or modification of the spectral content of the light source 12 with a suitable spectrum shaping filter 26, there are distinct advantages and disadvantages to this approach. As illustrated by the modified system response curve 32 shown in FIG. 2, the biggest disadvantage to using masks and filters is that there is a significant loss of light in comparison to the unmodified system response, particularly in the central part of the spectrum. This may be problematic when losses of light in sample 22 are very large and when even in the central part of the spectrum the light intensity is insufficient to obtain a high quality signal. Thus, by trying to flatten the system response, the quality of the signal in the parts of spectrum where signal was high can be substantially compromised, and the signal to noise ratio is degraded across a large part of the spectrum.

Figure 3:
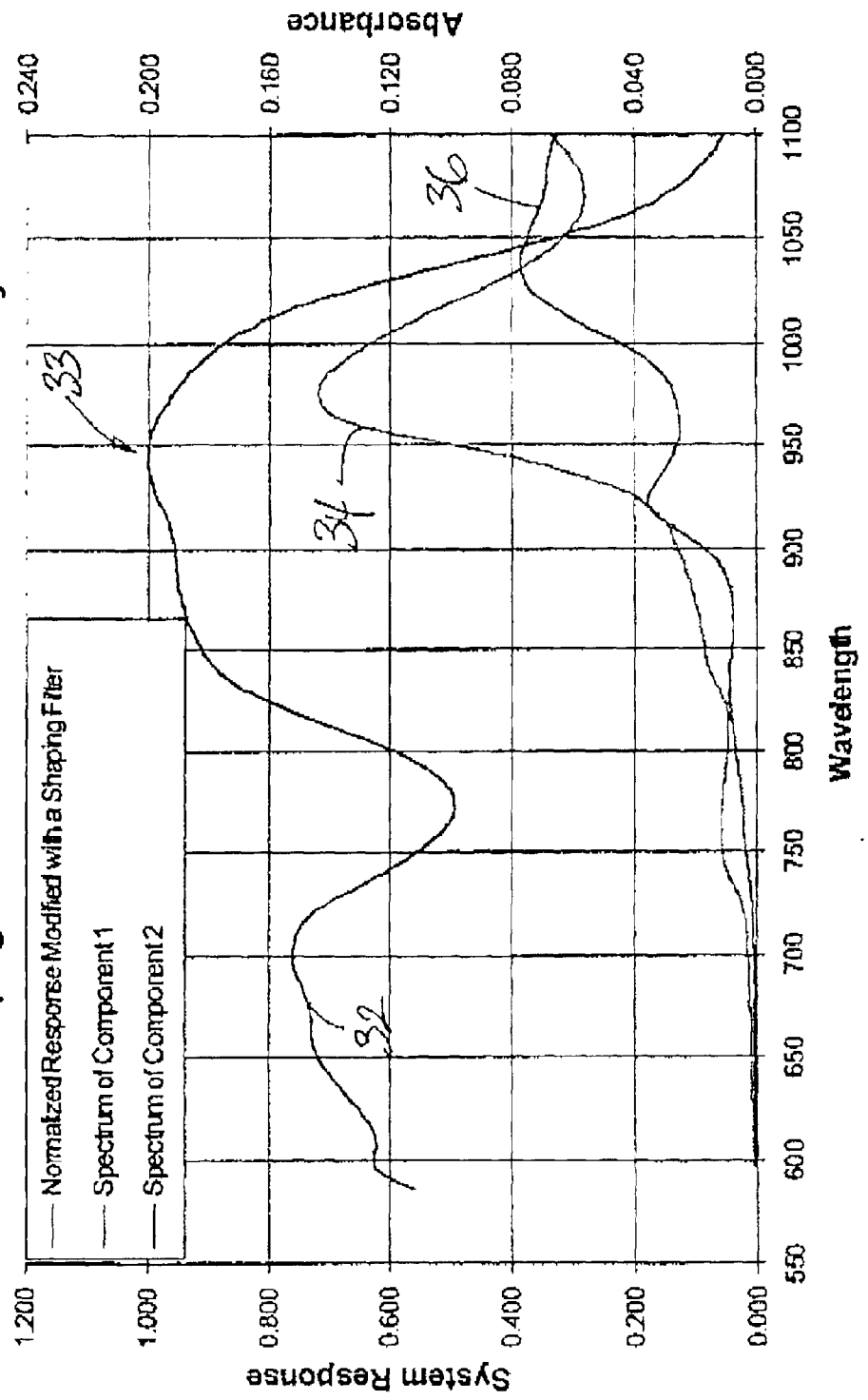
FIG. 3 shows a graph of a modified system response curve achieved with a shaping filter.

Now, referring to FIG. 3, the modified system response curve 32 of FIG. 2 is shown on an expanded vertical scale with a normalized peak 33 occurring at about 950 nm. Also shown in FIG. 3 are absorbance curves 34, 36 (measured off of the right vertical scale) for component 1 and component 2, respectively. In the example shown in FIG. 3, while the modified system response curve 32 varies roughly within a factor of 2 between approximately 580 nm and 1030 nm, the system response still degrades very rapidly above 1030 nm. Thus, even if an instrument with this modified system response curve 32 is able to provide adequate performance for characterization of the absorbency of component 1 (curve 34), an important part of the information for component 2 (curve 36) can be missed due to the poor system response above 1030 nm. Attempts to achieve further improvements by using masks and filters becomes impractical because of even greater losses of light in the wider spectral range, resulting in a weaker signal, longer measurement time and reduced S/N ratio.

Recognizing the problems associated with application of masks and filters, the present inventor has realized that an entirely different approach can be used to enhance the performance of photodetector array based spectrometers. Rather than relying entirely on the spectrum shaping filters 26 to modify the spectral content of the light source 12 by introduction of intended spectral losses, and/or masks 28 to modify the signal reaching the PDA 19, surprising results may be obtained using a completely different approach. Specifically, the spectrum produced by the light source 12 can be enhanced by adding more light in the spectral areas when the registered signal due to poor system response is not sufficient. Referring back to FIG. 2, for example, this would mean providing light to boost the signal on either side of the peak of curve 30.

Virtually any light source with a complementary spectrum can be used for this purpose. For example, the light source can be a broad band light source with a suitable shaping filter; or the light source can have a limited spectral band like narrow band fluorescent light sources, light emitting diodes (LEDs), and lasers. The type of secondary light source may be of an type, but the secondary light source(s) should contribute light only in the band width(s) where signal provided by the primary light source is insufficient. For example, for an instrument with the system response curve shown in FIG. 2, secondary light sources can be added to contribute light in bands below 750 nm and above 850 nm.

The use of secondary light sources is illustrated by way of example in FIG. 4, where a combined light source 40 now comprises a main light source 12 and at least one secondary light source 12a which can compliment the light spectrum of the main light source 12 to achieve a flatter system response.

While adding secondary light sources 12a, etc. can greatly improve the system response in areas where the signal was low, without reducing the signal in remaining parts of the spectrum, it has been realized by the present inventor that the combination of the use of secondary lights sources 12a, etc. together with suitable filters 26' and/or masks 28' can be used to flatten the resulting system response while minimizing their impact on remaining parts of the spectrum. In view of the method of the invention it is no longer necessary to rely entirely on the filters/masks to achieve a flatter response, the filters 26' and/or masks 28' can be chosen to have minimal light loss. Thus, using both methods (i.e. removing light in places where the signal is too strong, and adding light where it is too weak) can be combined to obtain the best overall performance of the system.

As an example, the system with the modified response curve 32 as shown in FIG. 3 may be improved by adding secondary light sources to compensate for the signal loss around 775 nm and above 1025 nm. Then, filters 26' and/or masks 28' can be chosen to flatten any conspicuous peaks, which remain in the modified system response curve. Accordingly a significant improvement in performance over prior art instruments can be achieved.

As mentioned above, there are numerous ways in which two or more sources can be combined. As shown in FIG. 5A, in some cases sources themselves can be transparent to the light outside their radiation band. In this case, light sources can be placed one after the other, i.e. generally axially aligned, as represented by primary and secondary light sources 12 and 12a in FIG. 5A. In another embodiment, as shown in FIG. 5B, the primary and secondary light sources 12, 12a can be combined using a suitable dichroic mirror 51 after the light from the sources 12, 12a is first collected with light collecting elements 52 and 52a and possibly spectrally modified by means of spectrum shaping filters 26' and 26'a. It is possible that, in addition to combining light from the two sources 12, 12a, the dichroic mirror 51 may also act as a spectrum modifying element.

In other embodiments, the dichroic mirror 51 may be replaced by a diffraction grating, prism or special holographic element 53 as shown by way of example in FIG. 5C.

In some cases, especially when light scattering samples are tested, light from different sources can be combined by means of multi branched fiber optic bundles. This is illustrated by way of example in FIG. 5D, where light from multiple light sources 12a–12d is directed by separate optical bundles 54a–54d (or by separate branches of a multiply branched fiber optic bundle) and mixed together. The multiple light sources 12a–12d may be directly coupled to the fiber optic bundles 54a–54d, or light from the multiple light sources 12a–12d may first be collected by means of auxiliary optical elements 52a–52d. Furthermore, the light from each light source 12a–12d may be individually filtered by separate filters 26a–26d. Once light from the light sources 12a–12d have been combined, the spectrum of mixed light can be additionally modified with another spectrum shaping filter 26 and can be directly (or by means of auxiliary optical system 14) delivered to a sample 22. After interaction with the sample 22, light can be collected in any one of many possible means and directed for spectral analysis.

While the invention has been particularly shown and described with reference to certain embodiments, it will be understood by those skilled in the art that various other changes in form and detail may be made without departing from the spirit and scope of the invention. In particular, while the embodiments have described spectrometers having photodetector arrays, it will be understood that adding secondary light sources to compliment the light spectrum of the main light source can be adapted for spectrometers having different signal receiving measurement means. Also, while an instrument having a particular wavelength operating spectrum has been shown by way of example, it will be understood that the teachings of the present invention may be extended to spectrometers operating at any range of wavelengths. It will also be appreciated by those skilled in the art that when more than one spectrometer is used in parallel, the method can be used for optimization of combined performance of the whole system to obtain the best instrument response in the working range of all of the spectrometers. It is therefore intended that the following claims cover all such changes and modifications that are within the spirit and scope of this invention.

I claim:

1. A method for improving the system response of a photodetector array based spectrometer having a main light source with a primary spectral output, comprising the steps of:
    (i) determining a system response curve for said spectrometer over said spectrometer's operating spectral range;
    (ii) identifying at least one spectral band at which the system response curve falls below a predetermined value; and
    (iii) adding at least one secondary light source with a secondary spectral output complementary to said at least one spectral band identified in step (ii) so as to produce a combined spectral output which provides a modified system response curve which is at or above said predetermined value at said spectral band.

2. The method claimed in claim 1, further comprising the step of filtering said combined spectral output so as to reduce peaks in said system response curve.

3. The method claimed in claim 2, further comprising the step of masking said photodetector array so as to equalize said system response curve.

4. A light source for a photodetector array based spectrometer, said light source comprising a primary light source producing a primary spectral output, said primary light source having a spectral range of from about 580 nm to about 1080 nm, said primary spectral output resulting in a system response curve having one, or more than one spectral band falling below a predetermined value within the spectral range of from about 580 nm to about 750 nm, or from about 850 nm to about 1080 nm, or both, and one, or more than one secondary light source producing a secondary spectral output complementary to said primary spectral output, wherein said secondary spectral output has a spectral range of from about 580 nm to about 750 nm, or from about 850 nm to about 1080 nm, or both, wherein said secondary spectral output combines with said primary spectral output to produce a more uniform system response curve that is flatter than the system response curve obtained when said primary light source alone is used.

5. The light source claimed in claim 4, wherein, the secondary light source is a broadband light source having a shaping filter.

6. The light source claimed in claim 4, wherein, the secondary light source is a narrow band light source.

7. The light source claimed in claim 6, wherein, said narrow band light source is selected from the group consisting of a narrow band fluorescent light source, a light emitting diode, and or a laser.

8. The light source claimed in claim 4, wherein, multiple light sources are combined by means of multiple branches of fibre optic bundles.

9. A method for improving the system response of a photodetector array based spectrometer having a primary light source with a primary spectral output, comprising the steps of:
    (i) determining a system response curve for said spectrometer over said spectrometer's operating spectral range;
    (ii) identifying one, or more than one spectral band at which the system response curve falls below a predetermined value; and
    (iii) determining a modified system response curve for said spectrometer using said primary light source and one, or more than one secondary light source with a secondary spectral output, said secondary spectral output being complementary to said primary spectral output, wherein said modified system response curve having a value at or above said predetermined value at said one, or more than one spectral band.

10. The method claimed in claim 9, further comprising the step of filtering said combined spectral output so as to reduce peaks in said system response curve.

11. The method claimed in claim 10, further comprising the step of masking said photodetector array so as to equalize said system response curve.

12. A method for improving the system response of a photodetector array based spectrometer having a primary light source with a primary spectral output, comprising the steps of:
  (i) determining a system response curve for said spectrometer over said spectrometer's operating spectral range;
  (ii) identifying one, or more than one spectral band at which the system response curve falls below a predetermined value; and
  (iii) adding to said primary light source one, or more than one secondary light source with a secondary spectral output to produce a combined light source, said secondary spectral output being complementary to said primary spectral output of said primary light source, wherein said combined light source produces a modified system response curve having a value at or above said predetermined value at said one, or more than one spectral band.

13. The method claimed in claim 12, further comprising the step of filtering said combined spectral output so as to reduce peaks in said system response curve.

14. The method claimed in claim 13, further comprising the step of masking said photodetector array so as to equalize said system response curve.

* * * * *